June 20, 1944.  W. J. MORRILL  2,351,997

DYNAMOELECTRIC MACHINE DRIVE

Filed March 12, 1943

Inventor:
Wayne J. Morrill,
by Harry E. Dunham
His Attorney.

Patented June 20, 1944

2,351,997

UNITED STATES PATENT OFFICE 2,351,997

DYNAMOELECTRIC MACHINE DRIVE

Wayne J. Morrill, Fort Wayne, Ind., assignor to General Electric Company, a corporation of New York Application March 12, 1943, Serial No. 478,922

3 Claims. (Cl. 192—2)

My invention relates to dynamo-electric machines and particularly to a driving construction wherein a gear connected to the dynamo-electric machine shaft is adapted to be operated and held stationary in response to the energization and deenergization respectively of the motor irrespective of the rotation of the rotatable member of the motor.

An object of my invention is to provide an improved dynamo-electric machine with a friction coupling between the driving shaft of the machine and a driven gear.

Another object of my invention is to provide an improved dynamo-electric machine drive wherein the coupling of the machine shaft and a driven gear is controlled responsive to the energization of a winding of the machine.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
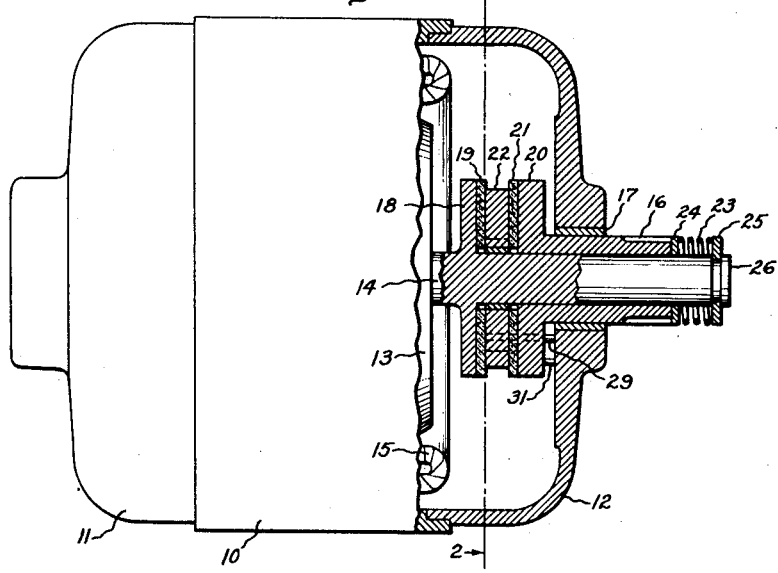
Figure 2:
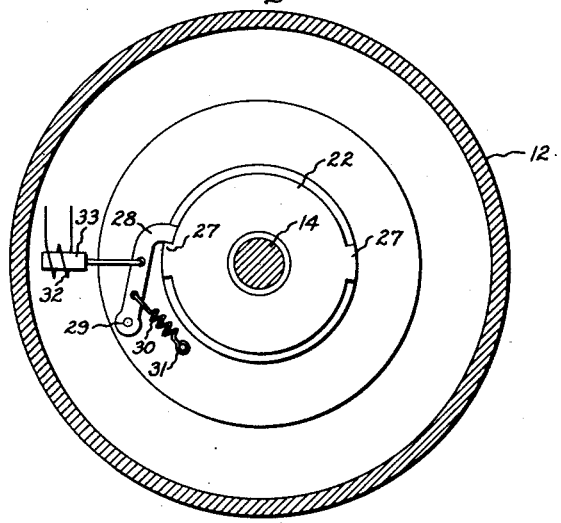

In the drawing, Fig. 1 is a side elevational view of a dynamo-electric machine, partly broken away, illustrating an embodiment of my invention; and Fig. 2 is a sectional view, taken along line 2—2 of Fig. 1.

Referring to the drawing, I have shown a dynamo-electric machine having a stationary member provided with a frame 10 and end shields 11 and 12 arranged to support a rotatable member 13 mounted on a drive shaft 14. In the illustrated construction the stationary member of the machine is excited by a field exciting winding 15 which is adapted to be energized by any suitable source of electrical power supply to provide for rotation of the rotatable member 13. The torque of the rotatable member is adapted to be transmitted to a driven gear member 16 which is rotatably mounted about the shaft 14 and is journaled in a bearing 17 mounted in the end shield 12. The coupling of the driven gear member 16 to the shaft 14 is provided by a friction coupling construction which includes a driving disk formed of a flange 18 on the shaft 14 and provided with a driving disk friction surface 19 mechanically connected through the disk 18 to the drive shaft 14. A second driving disk member is formed by a flange 20 integral with the driven gear 16 and provided with a driving disk friction surface 21 mechanically connected to the gear member 16 through the flange 20. A driving connection is provided between the two driving disks by a friction coupling disk member 22 arranged intermediate the two driving disk friction surfaces 19 and 21. A coil spring 23 is arranged about the outer end of the shaft 14 and is held between a pair of spring seat washers 24 and 25 arranged adjacent the end of the gear 16 and about the end of the shaft 14 and is held in position by a cap screw 26. This compression spring 23 resiliently biases the two disk friction surfaces 19 and 21 into engagement with the adjacent end surfaces of the coupling disk 22 and provides a driving connection therebetween. With this arrangement the torque of the rotatable member of the motor is transmitted to the drive shaft 14 through the disk friction surface 19, to the coupling disk 22, to the disk friction surface 21, and through the flange 20 to the driven gear 16.

In certain applications it has been found desirable to stop the rotation of the driven gear connected to the motor shaft in a very short interval of time as compared to the time in which the rotatable member of the motor would normally come to rest. In some instances it is desirable that the driven gear should stop rotating in two and one-half to three revolutions from a speed of 8,000 to 10,000 revolutions per minute. In order to accomplish this without producing any destructive stresses in the rotatable member of the driving motor, the coupling disk 22 is provided with a pair of projecting engagement elements or splines 27 on the outer periphery thereof which are adapted to be engaged by a stopping pawl 28 when the exciting winding 15 of the motor is deenergized. This stopping pawl 28 is pivotally supported by a suitable pivot pin 29 on the motor end shield 12 and is resiliently biased toward the coupling disk 22 and into engagement with the projecting elements 27 by a coil spring 30 also secured to the end shield 12 by a pin 31. Operation of the pawl 28 is controlled in response to the energization of the winding 15 by an electromagnetic device which includes a suitable solenoid 32 connected to the winding 15 so as to be energized and deenergized simultaneously with the winding 15. A suitable armature 33 of magnetic material is associated with the solenoid 32 and is connected to the stopping pawl 28 so that when the solenoid 32 and the winding 15 are energized the armature 33 is actuated and the pawl 28 is disengaged from the coupling member projecting elements 27, and when the winding 15 and the solenoid 32 are deenergized the armature 33 is not excited and the pawl 28 is released to its resiliently biased position in engagement with the coupling member projecting elements 27, as shown in Fig. 2. With this construction a driving connection is provided between the motor drive shaft 14 and the driven gear whenever the motor winding 15 is energized, and when the winding 15 is deenergized the pawl 28 is released and stops the rotation of the coupling disk 22 within a half revolution of this disk. The friction between the coupling disk 22 and the driving disk friction surface 21 permits the gear 16 to coast under the inertia of the driven mechanism for one or two revolutions of the gear 16 and also permits the rotatable member of the motor to come to rest under its own inertia independently of the driven gear 16. Thus I have provided a dynamo-electric machine drive in which the machine is adapted to rotate at a relatively high speed and in which the gear driven by the machine is stopped within a very short time after the machine winding is electrically deenergized.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamo-electric machine having a frame with a winding adapted to be energized electrically and a drive shaft, a driven member, means including a friction coupling member for providing a driving connection between said drive shaft and said driven member mounted on said shaft, means including projecting engagement elements on said coupling member and a stopping pawl mounted in said frame and arranged to engage said projecting elements for stopping said coupling member, means for resiliently biasing said pawl into engagement with said coupling member projecting elements, and means responsive to electrical energization of said winding for controlling the operation of said stopping pawl.

2. A dynamo-electric machine having a frame with a winding adapted to be energized electrically and a drive shaft, a driven member, means including a coupling member mounted on said shaft for providing a driving connection between said drive shaft and said driven member, means including projecting engagement elements on said coupling member and a pivotally mounted stopping pawl mounted in said frame and arranged to engage said projecting elements for stopping rotation of said coupling member and said driven member, means for resiliently biasing said pawl into engagement with said coupling member projecting elements, and means arranged within said frame and responsive to electrical energization of said winding for controlling the operation of said stopping pawl by disengaging said pawl from said coupling member projecting elements on energization of said winding and by releasing said pawl to its resiliently biased position in engagement with said coupling member projecting elements on deenergization of said winding.

3. A dynamo-electric machine having a frame with a winding adapted to be energized electrically and a drive shaft, a driven member including a gear rotatably mounted on said shaft, means including a friction driving disk member mechanically connected to said shaft and a friction driving disk member mechanically connected to said driven member gear with a coupling disk arranged between said two friction driving disk members for providing a driving connection between said drive shaft and said driven member gear all arranged within said frame and mounted on said shaft, means including a spring for resiliently biasing said two driving disk members into frictional engagement with said coupling disk, means including projecting engagement elements on said coupling disk and a pivotally mounted stopping pawl arranged to engage said projecting elements for stopping rotation of said coupling disk and said gear, means for resiliently biasing said pawl into engagement with said coupling member projecting elements, and means responsive to electrical energization of said winding for controlling the operation of said stopping pawl by disengaging said pawl from said coupling member projecting elements on energization of said winding and by releasing said pawl to its resiliently biased position in engagement with said coupling member projecting elements on deenergization of said winding.

WAYNE J. MORRILL.